(12) United States Patent
Shirota et al.

(10) Patent No.: US 9,374,739 B2
(45) Date of Patent: Jun. 21, 2016

(54) METHODS AND APPARATUS FOR CALLING PARTY NUMBER DISPLAY SOLUTIONS FOR 1XCSFB

(75) Inventors: Masakazu Shirota, Yokohama (JP); Jun Wang, La Jolla, CA (US); George Cherian, San Diego, CA (US); Arvind Swaminathan, San Diego, CA (US); Srinivasan Balasubramanian, San Diego, CA (US); Ravindra Manohar Patwardhan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 934 days.

(21) Appl. No.: 13/014,583

(22) Filed: Jan. 26, 2011

(65) Prior Publication Data

US 2011/0286427 A1    Nov. 24, 2011

Related U.S. Application Data

(60) Provisional application No. 61/345,875, filed on May 18, 2010.

(51) Int. Cl.
*H04W 4/00* (2009.01)
*H04W 36/00* (2009.01)
*H04W 68/12* (2009.01)

(52) U.S. Cl.
CPC .......... *H04W 36/0022* (2013.01); *H04W 68/12* (2013.01)

(58) Field of Classification Search
CPC .. H04W 36/18; H04W 36/0022; H04W 68/12
USPC ......... 370/338, 337, 339, 328, 329, 330, 331; 455/517, 219, 225, 551, 560
See application file for complete search history.

(56) References Cited

U.S. PATENT DOCUMENTS

| 6,788,649 B1 * | 9/2004 | Dugan et al. ................. 370/254 |
| 8,169,968 B1 * | 5/2012 | Stegall et al. ................ 370/331 |

(Continued)

FOREIGN PATENT DOCUMENTS

| CN | 1849001 A | 10/2006 |
| CN | 1933655 A | 3/2007 |

(Continued)

OTHER PUBLICATIONS

Digital cellular telecommunications system (Phase 2+); Universal Mobile Telecommunications System (UMTS); LTE; Circuit Switched (CS) fallback in Evolved Packet System (EPS); Stage 2 (3GPP TS 23.272 version 9.3.0 Release 9 ), Mar. 1, 2010, Technical Specification, European Telecommunications Standards Institute (ETSI), 650, Route Des Lucioles ; F-06921 Sophia-Antipolis ; France, XP014046437.

(Continued)

*Primary Examiner* — Abdelnabi Musa
(74) *Attorney, Agent, or Firm* — François A. Pelaez

(57) ABSTRACT

Controller and method for Handover (HO) based 1×CSFB communicates Calling Party Number (CPN) to User Equipment (UE) a in a cellular communication system. A first solution provides Interworking Solution (IWS) adding CPN sent to target Base Station Controller (BSC) via Mobile Switching Center (MSC) in Interoperability Specification (IOS) HO messages. A second solution provides that IWS sends CPN with Air Interface HO message and stores the CPN until UE transition to the target Radio Access Network and acquires a traffic channel. A third solution provides that IWS receives CPN from MSC with a paging message and stores the CPN until UE transition to the target Radio Access Network and acquires a traffic channel. A fourth solution provides sending AWI message to the target Radio Access Network from the MSC. A fifth solution provides that IWS sends CPN via Feature Notification Message (FNM) data tunneled to UE before the paging message to let user decide whether to accept a call before leaving 3G/4G cellular communication.

10 Claims, 12 Drawing Sheets

(56) References Cited

U.S. PATENT DOCUMENTS

| | | |
|---|---|---|
| 2008/0008122 A1 | 1/2008 | Yoon |
| 2008/0070498 A1 | 3/2008 | Tan et al. |
| 2008/0248817 A1* | 10/2008 | Gao et al. .................. 455/458 |
| 2009/0005048 A1* | 1/2009 | Bae et al. .................. 455/439 |
| 2009/0316696 A1 | 12/2009 | Zhao |
| 2010/0098023 A1* | 4/2010 | Aghili et al. ............... 370/331 |
| 2010/0265884 A1* | 10/2010 | Vikberg et al. ............. 370/328 |
| 2010/0290437 A1* | 11/2010 | Wang et al. ................ 370/335 |
| 2010/0317378 A1* | 12/2010 | Fang et al. ................. 455/466 |
| 2011/0014919 A1* | 1/2011 | Otte et al. .................. 455/442 |
| 2011/0080867 A1* | 4/2011 | Mildh ........................ 370/328 |

FOREIGN PATENT DOCUMENTS

| | | |
|---|---|---|
| CN | 1937807 A | 3/2007 |
| CN | 101640934 A | 2/2010 |
| EP | 2247039 A1 | 11/2010 |
| WO | 2007035061 A1 | 3/2007 |
| WO | 2009094916 A1 | 8/2009 |

OTHER PUBLICATIONS

International Search Report and Written Opinion—PCT/US2011/037050, ISA/EPO—Sep. 5, 2011.

Salkintzis A et al., "Voice call handover mechanisms in next-generation 3GPP systems", Feb. 1, 2009, IEEE Communications Magazine, IEEE Service Center, Piscataway, US, pp. 46-56, XP011280739, ISSN: 0163-6804.

3GPP_TS_23.272; "Circuit Switched Fallback in Evolved Packet System"; Quintillion.

"CS Fallback Function for Combined LTE and 3G Circuit Switched Services", Tanaka, et al., NTT DOCOMO Technical Journal vol. 11 No. 3, pp. 13-19.

* cited by examiner

METHODS AND APPARATUS FOR CALLING PARTY NUMBER DISPLAY SOLUTIONS FOR 1XCSFB

CLAIM OF PRIORITY UNDER 35 U.S.C. §119

The present application for patent claims priority to Provisional Application No. 61/345,875 entitled "Methods and Apparatus for Calling Party Number Display Solutions for 1×CSFB" filed 18 May 2010, and assigned to the assignee hereof and hereby expressly incorporated by reference herein.

BACKGROUND

The present disclosure relates generally to communication, and more specifically for a limited re-try attempt for an extended service request for a voice call tunneled from a data packet radio access technology in a wireless communication network.

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

Universal Mobile Telecommunications System (UMTS) is one of the third-generation (3G) cell phone technologies. UTRAN, short for UMTS Terrestrial Radio Access Network, is a collective term for the Node-B's and Radio Network Controllers (RNCs) which make up the UMTS radio access network. This communications network can carry many traffic types from real-time Circuit Switched to IP based Packet Switched. The UTRAN allows connectivity between the UE (user equipment) and the core network. The UTRAN contains the base stations, which are called Node Bs, and RNCs. The RNC provides control functionalities for one or more Node Bs. A Node B and an RNC can be the same device, although typical implementations have a separate RNC located in a central office serving multiple Node B's. Despite the fact that they do not have to be physically separated, there is a logical interface between them known as the Iub. The RNC and its corresponding Node Bs are called the Radio Network Subsystem (RNS). There can be more than one RNS present in an UTRAN.

CDMA2000 (also known as IMT Multi Carrier (IMT MC)) is a family of 3G mobile technology standards, which use CDMA channel access, to send voice, data, and signaling data between mobile phones and cell sites. The set of standards includes: CDMA2000 1×, and CDMA2000 1×EV-DO. All are approved radio interfaces for the ITU's IMT-2000. CDMA2000 has a relatively long technical history and is backward-compatible with its previous 2G iteration IS-95 (cdmaOne).

CDMA2000 1× (IS-2000), also known as 1× and 1×RTT, is the core CDMA2000 wireless air interface standard. The designation "1×", meaning 1 times Radio Transmission Technology, indicates the same RF bandwidth as IS-95: a duplex pair of 1.25 MHz radio channels. 1×RTT almost doubles the capacity of IS-95 by adding 64 more traffic channels to the forward link, orthogonal to (in quadrature with) the original set of 64. IMT-2000 also made changes to the data link layer for the greater use of data services, including medium and link access control protocols and Quality of Service (QoS). The IS-95 data link layer only provided "best effort delivery" for data and circuit switched channel for voice (i.e., a voice frame once every 20 ms).

CDMA2000 1×EV-DO (Evolution-Data Optimized), often abbreviated as EV-DO or EV, is a telecommunications standard for the wireless transmission of data through radio signals, typically for broadband Internet access. It uses multiplexing techniques including code division multiple access (CDMA) as well as time division multiple access (TDMA) to maximize both individual user's throughput and the overall system throughput. It is standardized by Third Generation Partnership Project 2 (3GPP2) as part of the CDMA2000 family of standards and has been adopted by many mobile phone service providers around the world, particularly those previously employing CDMA networks.

3GPP LTE (Long Term Evolution) is the name given to a project within the Third Generation Partnership Project (3GPP) to improve the UMTS mobile phone standard to cope with future requirements. Goals include improving efficiency, lowering costs, improving services, making use of new spectrum opportunities, and better integration with other open standards. The LTE system is described in the Evolved UTRA (EUTRA) and Evolved UTRAN (EUTRAN) series of specifications.

Interworking between different Radio Access Technologies (RATs) can be utilized to provide substantially continuous communication service for a mobile device in a multi-radio communication system. For example, interworking between respective RATs can be utilized to facilitate data session continuity, voice call continuity, fallback to circuit switched (CS) service, or the like, even in a case where a mobile terminal or other device moves between different RATs. However, in the event that a mobile device or one or more systems with which a mobile device is associated do not support various services or other functionality, one or more communication services associated with the mobile device can be partially continued. Accordingly, it would be desirable to implement techniques for managing communication sessions associated with a mobile device in a multi-radio wireless environment.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, the present disclosure provides a method for performing 1× circuit switch fallback (1×CSFB) mobile termination in a cellular communication system by detecting, at an Interworking Solution (IWS), fall back of a user equipment (UE) from a source Radio Access Network using Packet Switched (PS) network to a target Radio Access Network using a Circuit Switched (CS) network, and by communicating a Calling Party Number (CPN) to the UE.

In a first exemplary solution, the present disclosure further provides a method for communicating the CPN to the UE by adding CPN to IOS Handover (HO) messages sent from the IWS to the target BSC via a Mobile Switching Center (MSC) and sending a 1× layer 3 message with CPN to the UE.

In a second exemplary solution, the present disclosure further provides a method for communicating the CPN to the UE by sending CPN by IWS sent via data tunneling to the UE along with a 1× layer 3 message to be used for channel assignment for storing at the UE until the UE transitions to 1× and acquires a traffic channel.

In a third exemplary solution, the present disclosure further provides a method for communicating the CPN to the UE by receiving a paging message with the CPN from a MSC at the IWS, and concurrently sending the paging message and a 1× layer 3 message having the CPN via Generic Circuit Service Notification Application (GCSNA) data tunneling to the UE for performing a page match, processing the 1× layer 3 message having the CPN, and storing the CPN for displaying after a traffic channel is assigned in 1× network.

In a fourth exemplary solution, the present disclosure further provides a method for communicating the CPN to the UE by sending an Alert With Information (AWI) with the CPN from a MSC to the target Radio Access Network in response to execution of a HO as part of 1×CSFB procedure before receiving a connect message, and sending a 1× layer 3 message with CPN to the UE.

In a fifth exemplary solution, the present disclosure further provides a method for communicating the CPN to the UE by receiving a paging message with a message having the CPN from a Mobile Switching Center (MSC) at the IWS, and sending a 1× layer 3 message having the CPN via GCSNA data tunneling to the UE first, processing the 1× layer 3 message, and for alerting with the CPN, sending another 1× layer 3 message when an user accepts a mobile terminated call to the IWS, and sending a 1× layer 3 paging message via GCSNA data tunneling to the UE to acknowledge in response to the UE indicating acceptance of the CPN.

In another aspect, the present disclosure provides at least one processor for performing 1×CSFB mobile termination in a cellular communication system. A first module detects, at an IWS, a fall back of a UE from a source Radio Access Network using PS network to a target Radio Access Network using a CS network. A second module communicates a CPN to the UE.

In an additional aspect, the present disclosure provides a computer program product for performing 1×CSFB mobile termination in a cellular communication system. A non-transitory computer-readable storage medium comprises a first set of code for causing a computer to detect, at an IWS, a fall back of a UE from a source Radio Access Network using PS network to a target Radio Access Network using a CS network. A second set of code causes the computer to communicate a CPN to the UE.

In a further aspect, the present disclosure provides an apparatus for performing 1×CSFB mobile termination in a cellular communication system. The apparatus comprises means for detecting, at an IWS, a fall back of a UE from a source Radio Access Network using PS network to a target Radio Access Network using a CS network. The apparatus comprises means for communicating a CPN to the UE.

In yet another aspect, the present disclosure provides an apparatus for performing 1×CSFB mobile termination in a cellular communication system. A controller detects, at an IWS, a fall back of a UE from a source Radio Access Network using PS network to a target Radio Access Network using a CS network. A network interface communicates a CPN to the UE.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Figure 1:
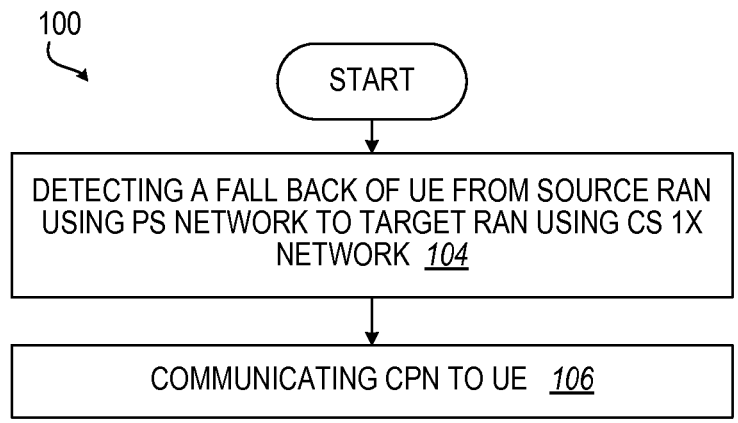
FIG. 1 illustrates a flow diagram of a methodology for performing 1× Circuit Switch Fallback (1×CSFB) Mobile Termination in a cellular communication system.

For user equipment (UE) that can utilize 3G/4G cellular Radio Access Technologies (RAT) for Packet Switched (PS) communication, occasions arise when the UE needs to fall back to a Radio Access Network using Circuit Switched (CS) communication. In particular, 1× Circuit Switch Fallback (1×CSFB) and enhanced 1×CSFB (e1×CSFB) procedures have already been defined in 3GPP. Similarly, 3GPP2 also defines the Generic Circuit Services Notification Application (GCSNA) as a tunneling protocol between the UE and 1×CS Interworking Solution (IWS).

Generally, it is assumed that the Interworking Solution (IWS) and 1× Base Station Control (1×BSC) are co-located. The Mobile Switching Center (MSC) provides a calling party number to IWS/BSC in the Assignment Request message after the MSC receives a page response. It should be appreciated that HO procedure in IWS/BSC may not be visible at MSC. In this example, MSC is not aware that a handoff has been performed. The IWS/1×BSC provides a calling party number after a traffic channel is assigned over 1×.

The present disclosure recognizes a first issue with regard to implementing 1×CSFB with benefit of CPN. If the IWS and 1×BSC are co-located, it is possible to reuse the native 1× procedure. However, this solution may not apply if the IWS and 1×BSC are separate entities. If the IWS and 1×BSC are not co-located, then there may be no way to know a CPN at a target BSC which actually triggers the alerting at the UE in handover (HO) based 1×CSFB.

The present disclosure further recognizes a second issue. Current standards do not support calling party number display before the UE tunes to 1× Radio Transmission Technology (1×RTT) access. It would be desirable that the UE does not have to leave 3G/4G cellular communication (e.g., LTE) when a call is rejected.

The present disclosure provides an apparatus and methods for 1×CSFB in a cellular communication system that communicates CPN to an UE in order to address the first issue.

A first solution provides that IWS adds Calling Party Number (CPN) sent to target BSC via MSC in Interoperability Specification (IOS) HO messages.

Alternatively, a second solution provides that IWS sends CPN with Air Interface message and stores the CPN until the UE tunes to the 1×RTT access.

Alternatively, a third solution provides that IWS receives CPN from a MSC with a paging message and stores the CPN until the UE tunes to the 1×RTT access.

Alternatively, a fourth solution provides sending AWI message to the target BSC from the MSC. For instance, the MSC sends AWI with the CPN during both a CSFB and a native CS operation.

The present disclosure further provides an apparatus and methods to resolve the second issue of displaying CPN in an alert of call prior to leaving 3G/4G cellular communication to handoff to the 1×RTT access. In particular, the fifth solution provides that IWS sends CPN via an 1× Air Interface Message (e.g., Feature Notification Message) data tunneled to UE before the paging message to let a user decide whether to accept a call before leaving a 3G/4G cellular communication (e.g., LTE).

It should be appreciated with the benefit of the present disclosure that certain terminology familiar to one skilled in the art of a given 3GPP or 3GPP2 or other cellular communication standard has been used herein for clarity. However, aspects consistent with the present innovation can be applied to equivalent entities and functions in various Radio Access Technologies (RATs).

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

In FIG. 1, a methodology 100 is depicted performing 1× circuit switch fallback (1×CSFB) mobile termination in a cellular communication system. In a communication network, an Interworking Solution (IWS) detects a fall back of a user equipment (UE) from a source Radio Access Network (RAN) using a Packet Switched (PS) network to a target RAN using a Circuit Switched (CS) 1× network (block 104). The communication network communicates a Calling Party Number (CPN) to the UE (block 106).

The present disclosure provides five exemplary solutions for communicating the CPN to the UE in FIGS. 2A-2E.

Figure 2A:
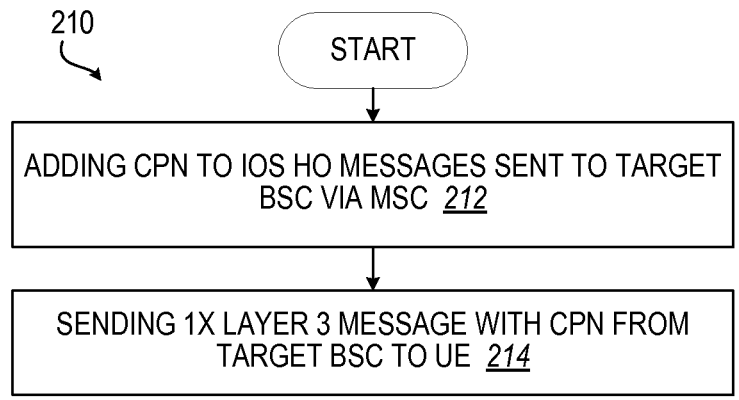
FIG. 2A illustrates a flow diagram of a methodology for performing a first solution for communicating Calling Party Number (CPN) to User Equipment (UE).

With reference to FIG. 2A, a first solution for communicating CPN to the UE is depicted at 210. The IWS adds CPN to IOS HO messages sent to the target BSC via a Mobile Switching Center (MSC) (block 212). The target BSC in turn sends a 1× layer 3 message with CPN to the UE (block 214).

Figure 2B:
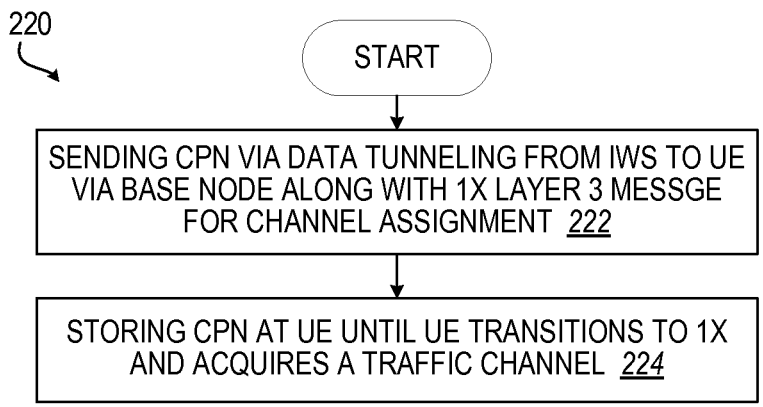
FIG. 2B illustrates a flow diagram of a methodology for performing a second solution for communicating CPN to UE.

With reference to FIG. 2B, a second solution for communicating CPN to the UE is depicted at 220. IWS sends CPN via data tunneling via a base node to the UE (block 222). The UE stores the CPN until the UE transitions to 1× and acquires a traffic channel (block 224). In the exemplary aspect, IWS sends a 1× layer 3 message with CPN via Generic Circuit Services Notification Application (GCSNA) data tunneling via the base node concurrently with a 1× handoff message.

Figure 2C:
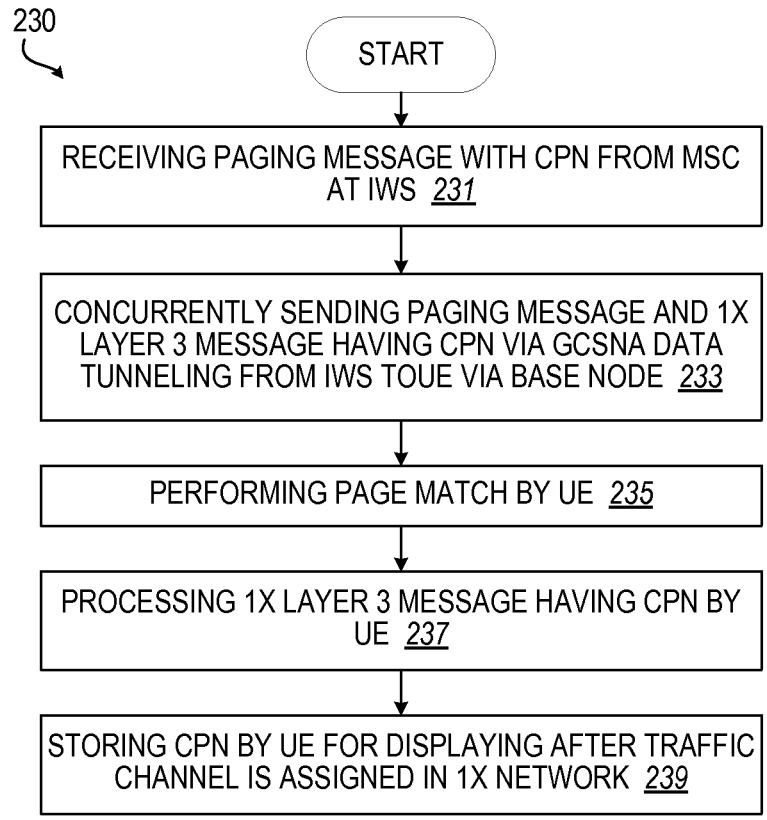
FIG. 2C illustrates a flow diagram of a methodology for performing a third solution for communicating CPN to UE.

With reference to FIG. 2C, a third solution for communicating CPN to the UE is depicted at 230. IWS receives a paging message with the CPN from a Mobile Switching Center (MSC) (block 231). IWS concurrently sends the paging message and a 1× layer 3 message having the CPN via GCSNA data tunneling via the base node to the UE (block 233). The UE performs a page match (block 235). The UE processes the 1× layer 3 message having the CPN (block 237). The UE stores storing the CPN for displaying after a traffic channel is assigned in 1× network (block 239).

Figure 2D:
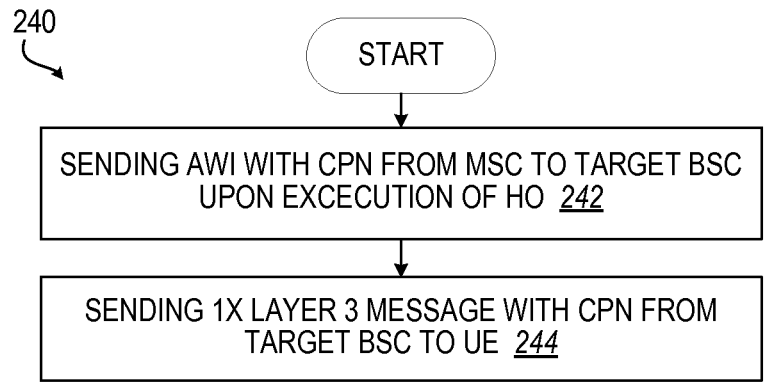
FIG. 2D illustrates a flow diagram of a methodology for performing a fourth solution for communicating CPN to UE.

With reference to FIG. 2D, a fourth solution for communicating CPN to the UE is depicted at 240. The MSC sends an Alert With Information (AWI) with the CPN to the target BSC in response to execution of a HO as part of 1×CSFB procedure before receiving a connect message (block 242). The target BSC sends a 1× layer 3 message with CPN to the UE (block 244).

Figure 2E:
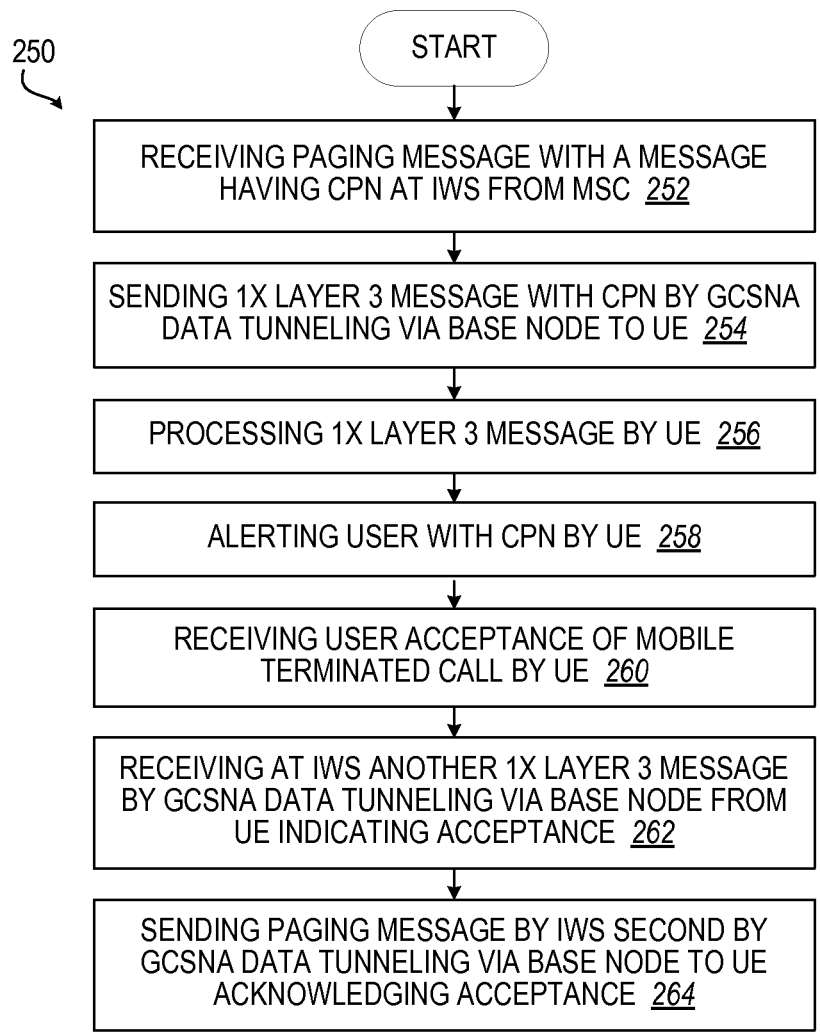
FIG. 2E illustrates a flow diagram of a methodology for performing a fifth solution for communicating CPN to UE.

With reference to FIG. 2E, a fifth solution for communicating CPN to the UE, and in particular to allow the UE to see the CPN before accepting the call, is depicted at 250. IWS receives a paging message with a message having the CPN from MSC (block 252). IWS sends a 1× layer 3 message having the CPN by GCSNA data tunneling via the base node to the UE first (block 254). The UE processes the 1× layer 3 message (block 256). The UE alerts the user with the CPN (block 258). In this instance, the user accepts the mobile terminated call (block 260). IWS receives another 1× layer 3 message by GCSNA data tunneling via the base node from the UE in response to the user acceptance of the mobile terminated call (block 262). IWS sends a paging message second by GCSNA data tunneling via the base node to the UE to acknowledge in response to the UE indicating acceptance of the CPN (block 264).

Figure 3:
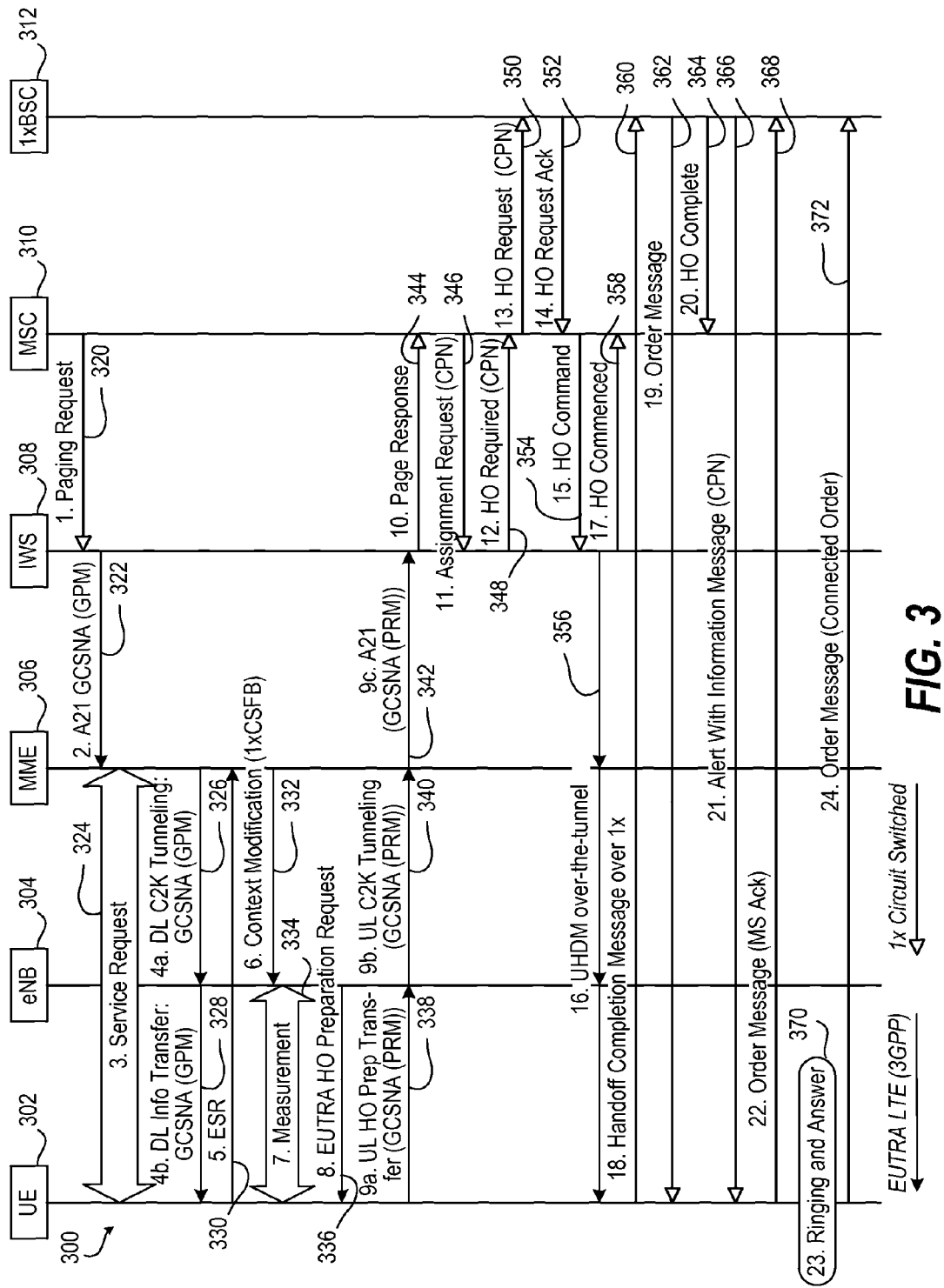
FIG. 3 illustrates a timing diagram for performing the first solution for communicating CPN to UE.

In FIG. 3, a communication system 300 supports both 3G and 4G (third or fourth generation) communication protocols (e.g., LTE for 4G and 1×CS for 3G). UE 302 is accessing LTE service from an eNB 304, which is in communication with a Mobility Management Entity (MME) 306. With the assistance of an IWS 308 and Mobile Switching Center (MSC)

310, UE 302 can perform 1×CSFB via tunneling to a 1×BSC 312 that is not co-located with the IWS 308.

In step 1, MSC 310 sends a paging request to IWS 308 as depicted at 320. In step 2, IWS 308 uses A21 Air interface signaling message to send General Paging Message (GPM) encapsulated in Generic Circuit Services Notification Application (GCSNA) message to MME 306 as depicted at 322. In step 3, UE 302, eNB 304, and MME 306 interact as UE 302 makes a service request as depicted at 324. In step 4a, MME 306 responds with downlink (DL) CDMA2000 (C2K) tunneling message containing GCSNA(GPM) to eNB 304 as depicted at 326, which in turn in step 4b transmits DL C2K information transfer message containing GCSNA(GPM) as depicted at 328. At step 5, UE 302 makes an Extended Service Request (ESR) to MME 306 as depicted at 330. In step 6, MME 306 sends context modification (1×CSFB) message to eNB 304 to trigger 1×CSFB procedure at eNB 304, as depicted at 332. In step 7, Inter RAT measurement is performed in UE 302 and measurement result is reported to eNB 304 as depicted at 334. In step 8, eNB 304 transmits Evolved Universal Terrestrial Radio Access (EUTRA) HO preparation request to UE 302 as depicted at 336.

In step 9a, UE 302 transmits uplink (UL) HO preparation transfer containing GCSNA (PRM) to eNB 304 as depicted at 338, wherein "PRM" refers to Page Response Message encapsulated. In step 9b, eNB 304 sends GCSNA(PRM) in UL C2K tunneling to MME 306, as depicted at 340. In step 9c, MME 306 uses A21 Air interface signaling message to send GCSNA(PRM) to IWS 308 as depicted at 342. In step 10, IWS 308 sends page response to MSC 310 as depicted at 344. In step 11, MSC 310 responds to IWS 308 with assignment request that includes Calling Party Number (CPN) as depicted at 346. In step 12, IWS 308 sends HO required with CPN to MSC 310 as depicted at 348. In step 13, MSC 310 sends HO request with CPN to 1×BSC 312 as depicted at 350. In step 14, 1×BSC 312 acknowledges (Ack) HO request to MSC 310 as depicted at 352. In step 15, MSC 310 sends HO command to IWS 308 as depicted at 354. In step 16, Universal Handoff-Direction Message (UHDM) encapsulated in GCSNA is sent from IWS 308 to MME 306 to eNB 304 to UE 302 as depicted at 356. In step 17, IWS 308 sends HO commenced to MSC 310 as depicted at 358. In step 18, UE 302 transmits handoff completion message over 1× to 1×BSC 312 as depicted at 360. In step 19, 1×BSC 312 transmits order message to UE 302 as depicted at 362. In step 20, 1×BSC 312 sends HO complete to MSC 310 as depicted at 364. In step 21, 1×BSC 312 transmits alert with information message including CPN to UE 302 as depicted at 366. In step 22, UE 302 transmits order message for mobile station (MS) Ack to 1×BSC 312 as depicted at 368. In step 23, UE 302 performs a call alert (e.g., rings), which is answered by a user as depicted at 370. In step 24, UE 302 transmits order message (i.e., connected order) to 1×BSC 312 as depicted at 372.

By virtue of the foregoing, a first solution is provided for CPN with interoperability specification (IOS) HO messages. In particular, Calling Party Number (CPN) is added in the HO messages in steps 12 and 13 as depicted respectively at 348 and 350. Target Base Station Controller (BSC), represented by 1×BSC 312, uses this information when it sends the Alert with Information message as depicted at step 21, depicted at 366. Although the current 1×CSFB architecture does not support an interface between the IWS 308 and BSC, it is technically possible to use A3/7 interfaces for HO procedure. In that case, CPN can be added in A7 Handoff request message.

Figure 4:
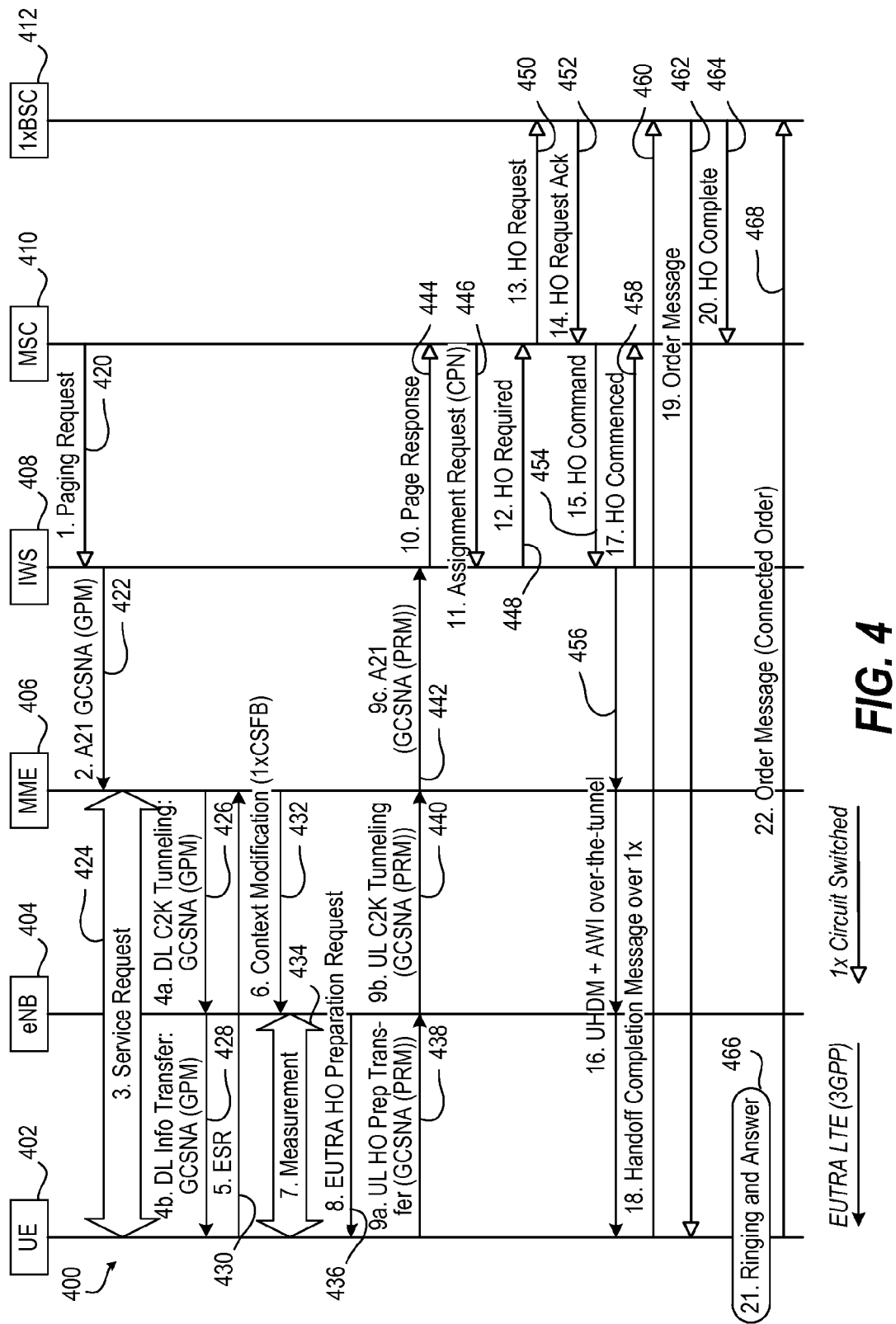
FIG. 4 illustrates a timing diagram for performing the second solution for communicating CPN to UE.

In FIG. 4, a communication system 400 supports both 3G and 4G communication protocols (e.g., LTE for 4G and 1×CS for 3G). UE 402 is accessing LTE service from an eNB 404, which is in communication with a MME 406. With the assistance of an IWS 408 and MSC 410, UE 402 can perform 1×CSFB via tunneling to a 1×BSC 412 that is not co-located with the IWS 408.

In step 1, MSC 410 sends a paging request to IWS 408 as depicted at 420. In step 2, IWS 408 uses A21 Air interface signaling message to send General Paging Message (GPM) encapsulated in GCSNA message to MME 406 as depicted at 422. In step 3, UE 402, eNB 404, and MME 406 interact as UE 402 makes a service request as depicted at 424. In step 4a, MME 406 responds with DL C2K tunneling message containing GCSNA(GPM) to eNB 404 as depicted at 426, which in turn in step 4b transmits DL C2K information transfer message containing GCSNA(GPM) as depicted at 428. At step 5, UE 402 makes an ESR to MME 406 as depicted at 430. In step 6, MME 406 sends context modification (1×CSFB) message to eNB 404 to trigger 1×CSFB procedure at eNB 404, as depicted at 432. In step 7, Inter RAT measurement is performed in UE 402 and measurement result is reported to eNB 404 as depicted at 434. In step 8, eNB 404 transmits EUTRA HO preparation request to UE 402 as depicted at 436.

In step 9a, UE 402 transmits UL HO preparation transfer containing GCSNA (PRM) to eNB 404 as depicted at 438. In step 9b, eNB 404 sends GCSNA(PRM) in UL C2K tunneling to MME 406, as depicted at 440. In step 9c, MME 406 uses A21 Air interface signaling message to send GCSNA(PRM) to IWS 408 as depicted at 442. In step 10, IWS 408 sends page response to MSC 410 as depicted at 444. In step 11, MSC 410 responds to IWS 408 with assignment request that includes CPN as depicted at 446. In step 12, IWS 408 sends HO required to MSC 410 as depicted at 448. In step 13, MSC 410 sends HO request to 1×BSC 412 as depicted at 450. In step 14, 1×BSC 412 acknowledges (Ack) HO request to MSC 410 as depicted at 452. In step 15, MSC 410 sends HO command to IWS 408 as depicted at 454. In step 16, GCSNA message containing both UHDM and Alert With Information Message (AWI) are sent over the tunnel from IWS 408 to MME 406 to eNB 404 to UE 402 as depicted at 456. In step 17, IWS 408 sends HO commenced to MSC 410 as depicted at 458. In step 18, UE 402 transmits handoff completion message over 1× to 1×BSC 412 as depicted at 460. In step 19, 1×BSC 412 transmits order message to UE 402 as depicted at 462. In step 20, 1×BSC 412 sends HO complete to MSC 410 as depicted at 464. In step 21, UE 402 performs a call alert (e.g., rings), which is answered by a user as depicted at 466. In step 22, UE 402 transmits order message (i.e., connected order) to 1×BSC 412 as depicted at 468.

By virtue of the foregoing, a second solution is provided for CPN with Air Interface (AI) message for channel assignment. In step 16, the IWS 408 sends a CPN in the AWI together with UHDM message (i.e., in 1×CSFB design, UHDM is used for 1× traffic channel assignment). Alternatively or in addition, a new field in the UHDM can be added to carry the CPN.

Figure 5:
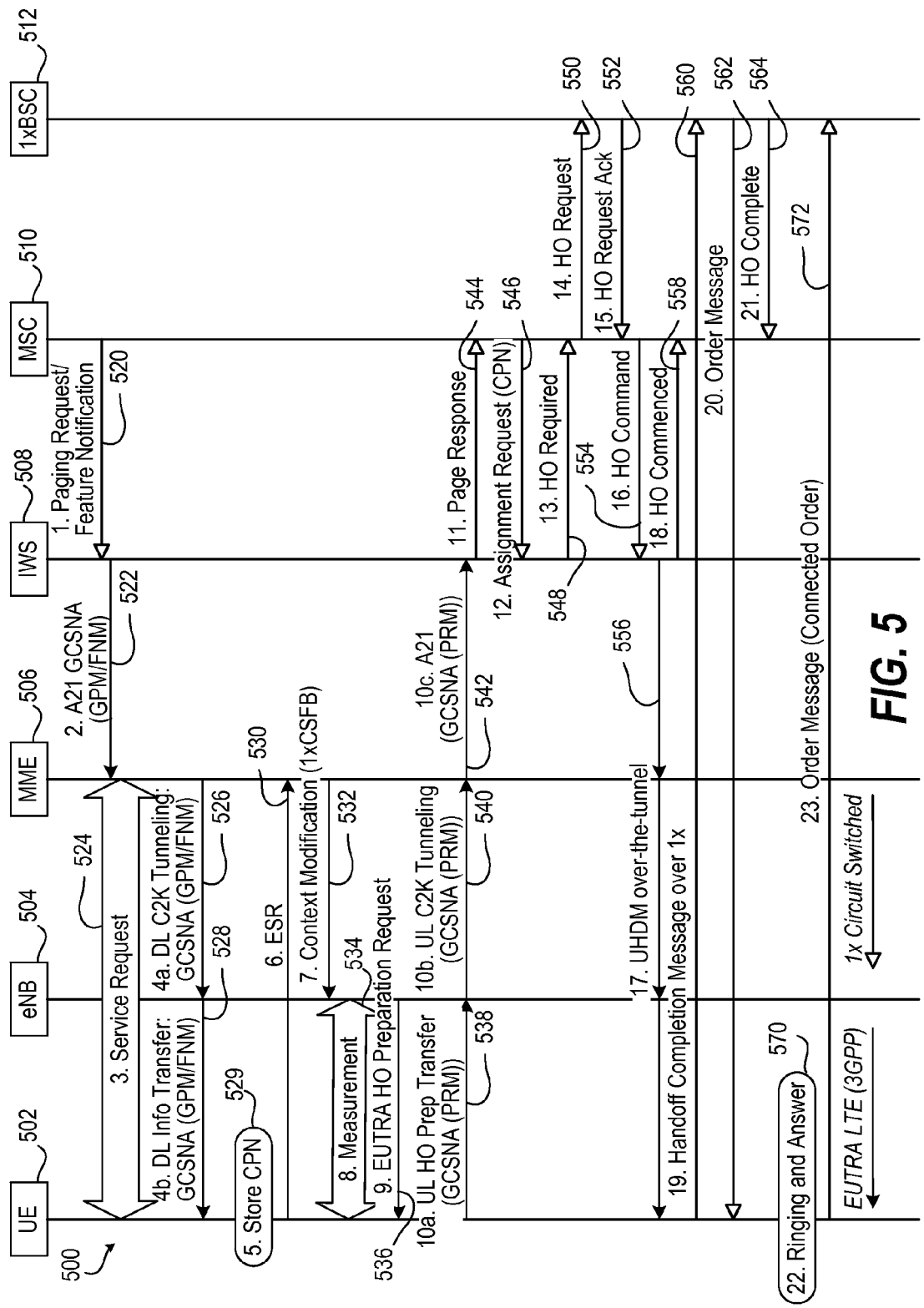
FIG. 5 illustrates a timing diagram for performing the third solution for communicating CPN to UE.

In FIG. 5, a communication system 500 supports both 3G and 4G communication protocols (e.g., LTE for 4G and 1×CS for 3G). UE 502 is accessing LTE service from an eNB 504, which is in communication with a MME 506. With the assistance of an IWS 508 and MSC 510, UE 502 can 1×CSFB via tunneling to a 1×BSC 512 that is not co-located with the IWS 508.

In step 1, MSC 510 sends a paging request with feature notification to IWS 508 as depicted at 520. In step 2, IWS 508 uses A21 Air interface signaling message to send GPM and Feature Notification Message (FNM) both encapsulated in Generic Circuit Services Notification Application (GCSNA) message to MME 506 as depicted at 522. In step 3, UE 502, eNB 504, and MME 506 interact as UE 502 makes a service request as depicted at 524. In step 4a, MME 506 responds with DL C2K tunneling message containing GCSNA(GPM and FNM) to eNB 504 as depicted at 526, which in turn in step 4b transmits DL C2K information transfer containing GCSNA(GPM and FNM) as depicted at 528. In step 5, UE 502 stores CPN (block 529). At step 6, UE 502 makes an ESR to MME 506 as depicted at 530. In step 7, MME 506 sends context modification (1×CSFB) message to eNB 504 to trigger 1×CSFB procedure at eNB 504, as depicted at 532. In step 8, Inter RAT measurement is performed in UE 502 and measurement result is reported to eNB 504 as depicted at 534. In step 9, eNB 504 transmits EUTRA HO preparation request to UE 502 as depicted at 536.

In step 10a, UE 502 transmits UL HO preparation transfer containing GCSNA(PRM) to eNB 504 as depicted at 538. In step 10b, eNB 504 sends GCSNA(PRM) in UL C2K tunneling to MME 506, as depicted at 540. In step 10c, MME 506 uses A21 Air interface signaling message to send GCSNA (PRM) to IWS 508 as depicted at 542. In step 11, IWS 508 sends page response to MSC 510 as depicted at 544. In step 12, MSC 510 responds to IWS 508 with assignment request that includes CPN as depicted at 546. In step 13, IWS 508 sends HO required to MSC 510 as depicted at 548. In step 14, MSC 510 sends HO request to 1×BSC 512 as depicted at 550. In step 15, 1×BSC 512 acknowledges (Ack) HO request to MSC 510 as depicted at 552. In step 16, MSC 510 sends HO command to IWS 508 as depicted at 554. In step 17, UHDM encapsulated in GCSNA is sent from IWS 508 to MME 506 to eNB 504 to UE 502 as depicted at 556. In step 18, IWS 508 sends HO commenced to MSC 510 as depicted at 558. In step 19, UE 502 transmits handoff completion message over 1× to 1×BSC 512 as depicted at 560. In step 20, 1×BSC 512 transmits order message to UE 502 as depicted at 562. In step 21, 1×BSC 512 sends HO complete to MSC 510 as depicted at 564. In step 22, UE 502 performs a call alert (e.g., rings), which is answered by a user as depicted at 570. In step 23, UE 502 transmits order message (i.e., connected order) to 1×BSC 512 as depicted at 572.

By virtue of the foregoing, a third solution is provided by GPM with FNM. In particular, Feature Notification Message with Calling Party Number is sent together with the GPM in step 1 as depicted at 520. After the page match, the UE processes the FNM and stores a CPN (steps 4a, 4b and 5) as depicted respectively at 526, 528, 529. CPN is displayed after a traffic channel is assigned (step 22) as depicted at 570.

Figure 6:
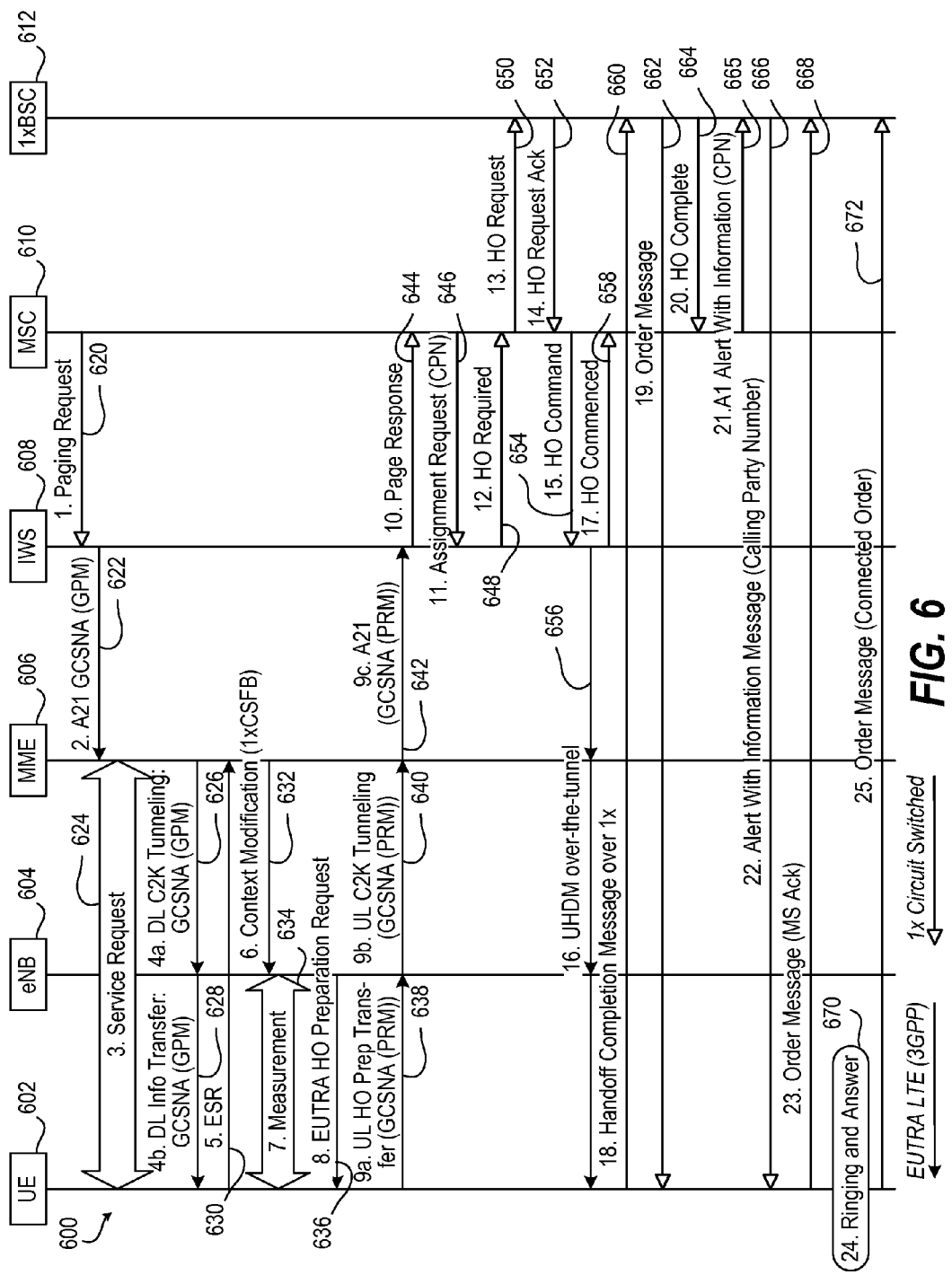
FIG. 6 illustrates a timing diagram for performing the fourth solution for communicating CPN to UE.

In FIG. 6, a communication system 600 supports both 3G and 4G communication protocols (e.g., LTE for 4G and 1×CS for 3G). UE 602 is accessing LTE service from an eNB 604, which is in communication with a MME 606. With the assistance of an IWS 608 and MSC 610, UE 602 can perform 1×CSFB via tunneling to a 1×BSC 612 that is not co-located with the IWS 608.

In step 1, MSC 610 sends a paging request to IWS 608 as depicted at 620. In step 2, IWS 608 uses A21 Air interface signaling message to send GPM encapsulated in GCSNA message to MME 606 as depicted at 622. In step 3, UE 602, eNB 604, and MME 606 interact as UE 602 makes a service request as depicted at 624. In step 4a, MME 606 responds with DL C2K tunneling message containing GCSNA(GPM) to eNB 604 as depicted at 626, which in turn in step 4b transmits DL C2K information transfer message containing GCSNA(GPM) as depicted at 628. In step 5, UE 602 makes an ESR to MME 606 as depicted at 630. In step 6, MME 606 sends context modification (1×CSFB) message to eNB 604 to trigger 1×CSFB procedure at eNB 604, as depicted at 632. In step 7, Inter RAT measurement is performed in UE 602 and measurement result is reported to eNB 604 as depicted at 634. In step 8, eNB 604 transmits EUTRA HO preparation request to UE 602 as depicted at 636.

In step 9a, UE 602 transmits UL HO preparation transfer containing GCSNA (PRM) to eNB 604 as depicted at 638. In step 9b, eNB 604 sends GCSNA(PRM) in UL C2K tunneling to MME 606, as depicted at 640. In step 9c, MME 606 uses A21 Air Interface signaling message to send GCSNA(PRM) to IWS 608 as depicted at 642. In step 10, IWS 608 sends page response to MSC 610 as depicted at 644. In step 11, MSC 610 responds to IWS 608 with assignment request that includes CPN as depicted at 646. In step 12, IWS 608 sends HO required to MSC 610 as depicted at 648. In step 13, MSC 610 sends HO request to 1×BSC 612 as depicted at 650. In step 14, 1×BSC 612 acknowledges (Ack) HO request to MSC 610 as depicted at 652. In step 15, MSC 610 sends HO command to IWS 608 as depicted at 654. In step 16, UHDM encapsulated in GCSNA is sent from IWS 608 to MME 606 to eNB 604 to UE 602 as depicted at 656. In step 17, IWS 608 sends HO connected to MSC 610 as depicted at 658. In step 18, UE 602 transmits handoff completion message over 1× to 1×BSC 612 as depicted at 660. In step 19, 1×BSC 612 transmits order message to UE 602 as depicted at 662. In step 20, 1×BSC 612 sends HO complete to MSC 610 as depicted at 664. In step 21, MSC 610 sends Alert With Information (AWI) message with CPN to 1×BSC 612 as depicted at 665. In step 22, 1×BSC 612 transmits AWI message including CPN to UE 602 as depicted at 666. In step 23, UE 602 transmits order message for mobile station (MS) Ack to 1×BSC 612 as depicted at 668. In step 24, UE 602 performs a call alert (e.g., rings), which is answered by a user as depicted at 670. In step 25, UE 602 transmits order message (i.e., connected order) to 1×BSC 612 as depicted at 672.

By virtue of the foregoing, a fourth solution is provided by AWI with CPN from MSC 610 to the 1×BSC 612. The MSC sends the AWI if HO procedure is executed before the connect message is received or it knows HO procedure has been performed with IWS for 1×CSFB.

Figure 7:
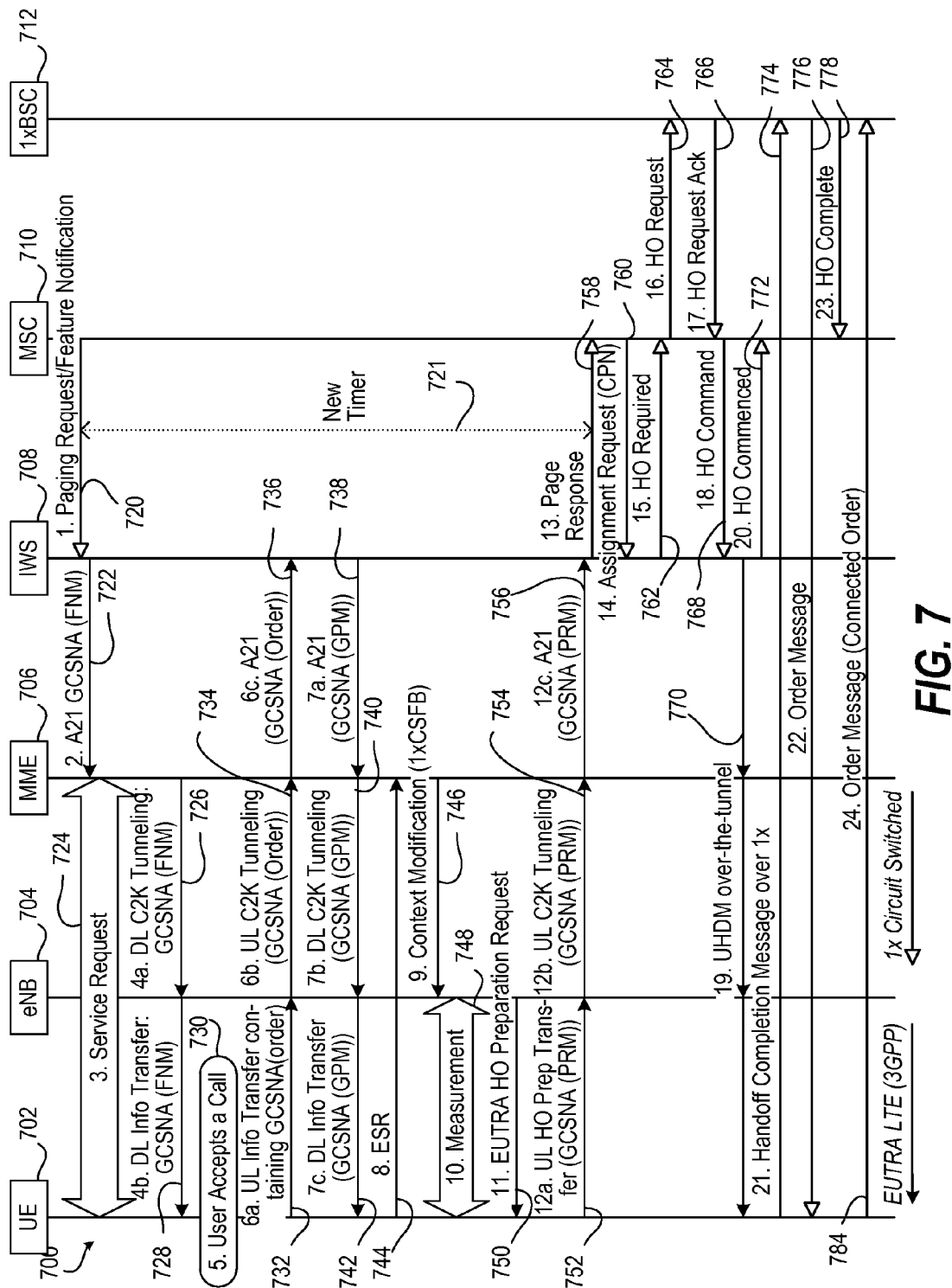
FIG. 7 illustrates a timing diagram for performing the fifth solution for communicating CPN to UE.

In FIG. 7, a communication system 700 supports both 3G and 4G communication protocols (e.g., LTE for 4G and 1×CS for 3G). UE 702 is accessing LTE service from an eNB 704, which is in communication with a MME 706. With the assistance of an IWS 708 and MSC 710, UE 702 can perform 1×CSFB via tunneling to a 1×BSC 712 that is not co-located with the IWS 708.

In step 1, MSC 710 sends a paging request with feature notification to IWS 708 as depicted at 720. A new timer at the MSC 710 is started between paging request and page response as depicted at 721. In step 2, IWS 708 uses A21 Air interface signaling message to send FNM encapsulated in GCSNA message to MME 706 as depicted at 722. In step 3, UE 702, eNB 704, and MME 706 interact as UE 702 makes a service request as depicted at 724. In step 4a, MME 706 responds with DL C2K tunneling message containing GCSNA(FNM) to eNB 704 as depicted at 726, which in turn in step 4b transmits DL information transfer message containing GCSNA(FNM) as depicted at 728. By virtue of having the CPN, UE enables a user to accept a call knowing the CPN (block 730). In step 6a, UE 702 transmits an UL information transfer containing GCSNA (order) to eNB 704. In step 6b, eNB 704 sends UL C2K tunneling containing GCSNA (Order) to MME 706 as depicted at 734. At step 6c, MME 706 sends via the A21 Air interface signaling message to send the GCSNA (Order) to IWS 708 as depicted at 736. In response, in step 7a IWS 708 sends GCSNA(GPM) in A21 Air interface signaling message to MME 706 as depicted at 738. In step 7b, MME 706 sends GCSNA(GPM) in DL C2K tunneling message to eNB 704 as depicted at 740. In step 7c, eNB 704 transmits GCSNA(GPM) in DL information transfer to UE 702 as depicted at 742. At step 8, UE 702 makes an ESR to MME 706 as depicted at 744. In step 9, MME 706 sends context modification (1xCSFB) message to eNB 704, as depicted at 746. In step 10, Inter RAT measurement is performed in UE 702 and measurement result is sent to eNB 704 as depicted at 748. In step 11, eNB 704 transmits EUTRA HO preparation request to UE 702 as depicted at 750.

In step 12a, UE 702 transmits UL HO preparation transfer containing GCSNA (PRM) to eNB 704 as depicted at 752. In step 12b, eNB 704 sends GCSNA(PRM) in UL C2K tunneling to MME 706, as depicted at 754. In step 12c, MME 706 uses A21 Air interface signaling message to send GCSNA (PRM) to IWS 708 as depicted at 756. In step 13, IWS 708 sends page response to MSC 710 as depicted at 758, which concludes new timer 721. In step 14, MSC 710 responds to IWS 708 with assignment request that includes CPN as depicted at 760. In step 15, IWS 708 sends HO required to MSC 710 as depicted at 762. In step 16, MSC 710 sends HO request to 1xBSC 712 as depicted at 764. In step 17, 1xBSC 712 acknowledges (Ack) HO request to MSC 710 as depicted at 766. In step 18, MSC 710 sends HO command to IWS 708 as depicted at 768. In step 19, UHDM encapsulated in GCSNA is sent from IWS 708 to MME 706 to eNB 704 to UE 702 as depicted at 770. In step 20, IWS 708 sends HO commenced to MSC 710 as depicted at 772. In step 21, UE 702 transmits handoff completion message over 1x to 1xBSC 712 as depicted at 774. In step 22, 1xBSC 712 transmits order message to UE 702 as depicted at 776. In step 23, 1xBSC 712 sends HO complete to MSC 710 as depicted at 778. In step 24, UE 702 transmits order message (i.e., connected order) to 1xBSC 712 as depicted at 784.

By virtue of the foregoing, a fifth solution is provided with the Feature Notification message is sent before the GPM is sent (Step 2). The UE or mobile station (MS) 702 performs alerting when the FNM is received. If a user accepts, the UE 702 sends a new message to acknowledge (Step 5 and 6). The IWS 708 then sends the GPM.

Figure 8:
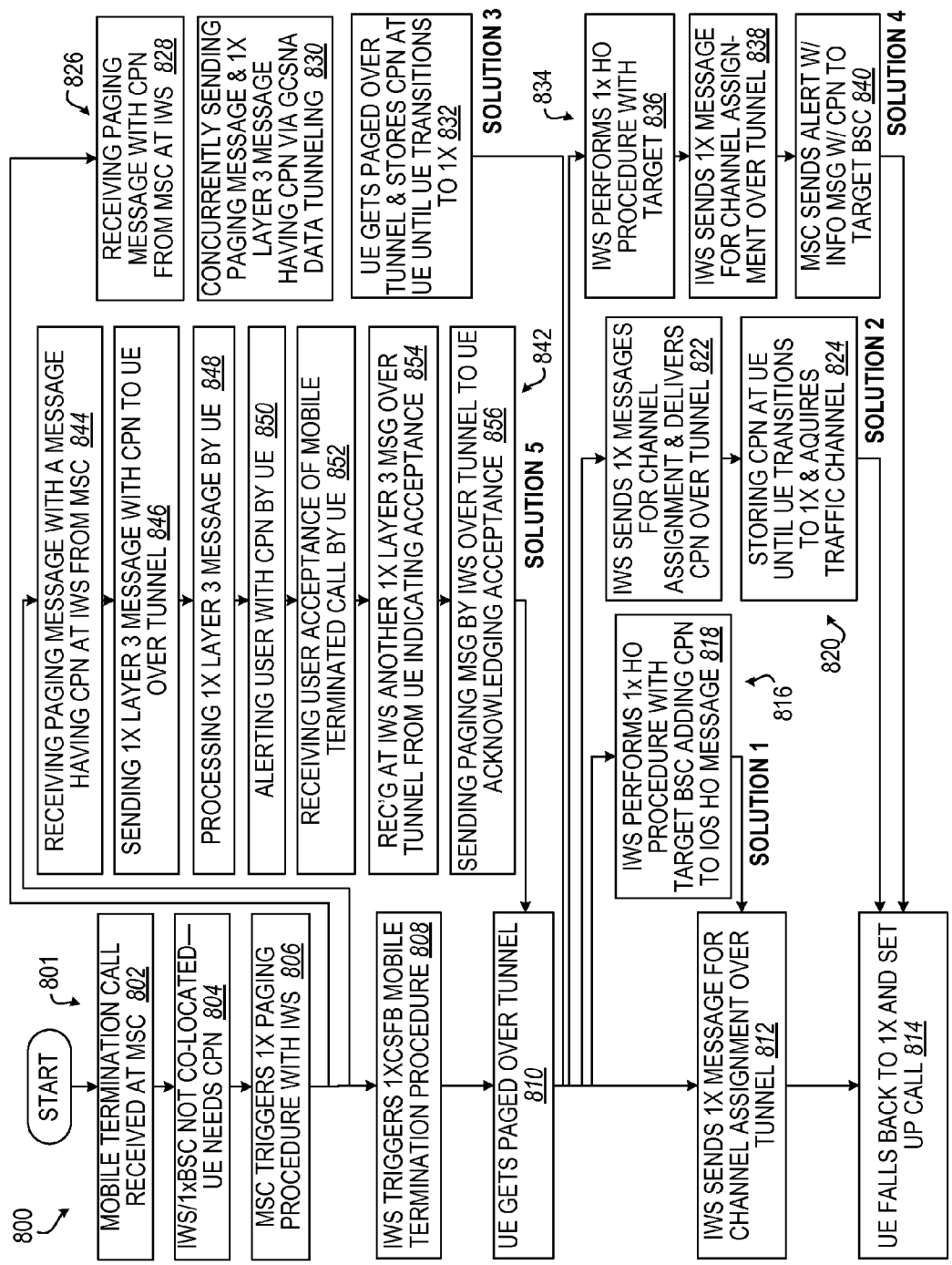
FIG. 8 illustrates a flow diagram of a methodology for performing 1× circuit switch fallback (1×CSFB) mobile termination in a cellular communication system.

In FIG. 8, a methodology 800 is depicted for performing 1xCSFB mobile termination in a mobile communication environment consistent with one aspect. A baseline portion 801 describes a situation in which User Equipment (UE) is connected to a Radio Access Network (RAN) for packet data communication ("PS RAN") has a need to fall back to a RAN for circuit switched ("1xRAN") communication (i.e., a circuit switched network). In block 802, mobile termination call is received at Mobile Switching Center (MSC). A need exists for getting the Calling Party Number (CPN) for the call to UE since the Interworking Solution (IWS) and 1x Base Station Control (1xBSC) are not co-located at the RAN (block 804). MSC triggers 1x paging procedure with IWS (block 806). IWS triggers 1xCSFB mobile termination procedure (block 808). UE gets paged over tunnel (block 810). IWS sends 1x message for channel assignment over tunnel (block 812). UE falls back to 1x and set up call (block 814).

SOLUTION 1: In one aspect depicted at 816, after block 810, IWS performs 1x Handoff (HO) procedure with target BSC (1xBSC) by adding CPN to Interoperability Specification (IOS) HO message (block 818). Thereafter, processing continues at block 812.

SOLUTION 2: In one aspect depicted at 820, after block 810, IWS sends 1x messages for channel assignment and delivers CPN over tunnel (block 822). UE stores CPN until transitioning to 1x and acquiring a traffic channel (block 824). Thereafter, processing continues at block 814.

SOLUTION 3: In one aspect depicted at 826, after block 806, IWS receives paging message with CPN from MSC (block 828). Paging message and 1x layer 3 message having CPN are concurrently sent via GCSNA data tunneling (block 830). UE gets paged over tunnel and stores CPN until UE transitions to 1x (block 832). Thereafter, processing continues at block 812.

SOLUTION 4: In one aspect depicted at 834, after block 810, IWS performs 1xHO procedure with target RAN (1xRAN) (block 836). IWS sends 1x message for channel assignment over tunnel (block 838). MSC sends alert with information message with CPN to target BSC (1xBSC) (block 840). Thereafter, processing continues at block 814.

SOLUTION 5: In one aspect depicted at 842, after block 806, IWS receives paging message with a message having CPN from MSC (block 844). 1x layer 3 message with CPN is sent to UE over tunnel (block 846). UE processes 1x layer 3 message (block 848). UE alerts user with CPN (block 850). UE receives user acceptance of mobile terminated call (block 852). IWS receives another 1x layer 3 message over the tunnel from UE indicating acceptance (block 854). IWS sends paging message over tunnel to UE acknowledging acceptance (block 856). Thereafter, processing continues at block 810.

Figure 9:
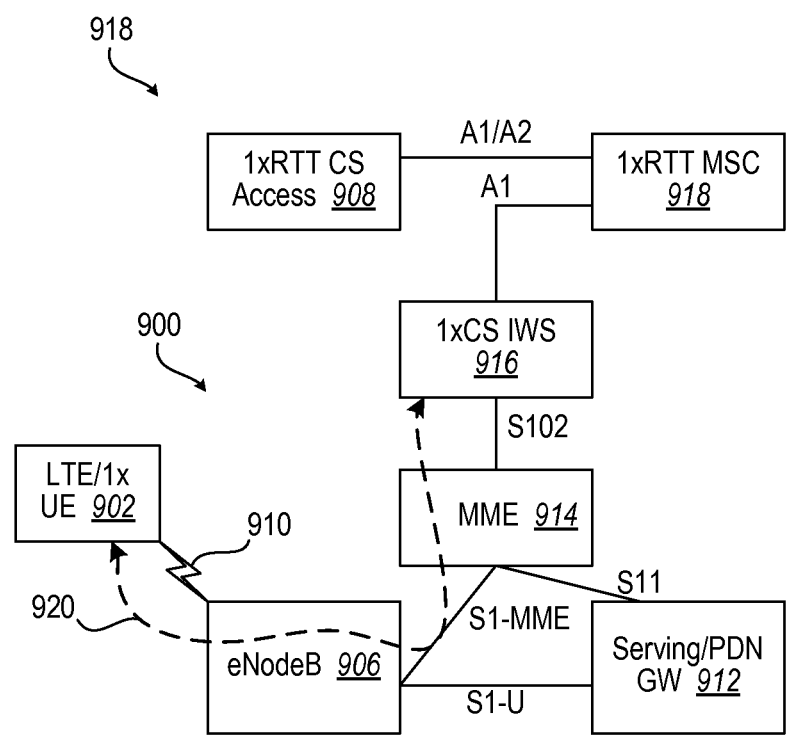
FIG. 9 illustrates a signaling flow diagram of 1×CSFB by UE.

In FIG. 9, a signaling flow 900 is depicted for UE, depicted as LTE/1xUE 902, beginning to move from EUTRAN packet data service, depicted as eNodeB 906, to service from a 1xRTT CS Access 908. UE 902 transmits and receives via an airlink 910 with the eNodeB 906. eNodeB 906 communicates via S1-U interface to serving/PDN gateway (GW) 912 and via S1-MME interface to MME 914. MME 914 also communicates with serving/PDN GW 912 via S11 interface and with 1xCS IWS 916 via S102. The 1xCS IWS 916 in turn communicates with 1xRTT MSC 918 via A1 Air Interface. 1xRTT CS Access 908 communicates via A1/A2 Air Interfaces with 1xRTT MSC 918. UE 902 performs 1xRTT messages over a data tunnel as depicted at 920 via eNodeB 906 and MME 914 to 1xCS IWS 916.

MME 914 works as an end point of A21 interface and understands A21 protocols. The MME 914 also provides a transport to the eNodeB 906 in order to forward GCSNA PDUs to the UE 902 or from UE 902.

A subset of 1x overhead parameters (e.g., registration parameters, RAND etc.) are pre-provisioned in eNodeB 906. CDMA2000 related information is provided by SIB8 and unicast messages. The CDMA System Time is provided in SIB8 to provide better performance for call set up time.

1xCS IWS 916 is seen as a BSC from 1xRTT MSC 918. It interacts with MME using A21 interface protocol. S102 is based on A21.

Figure 10:
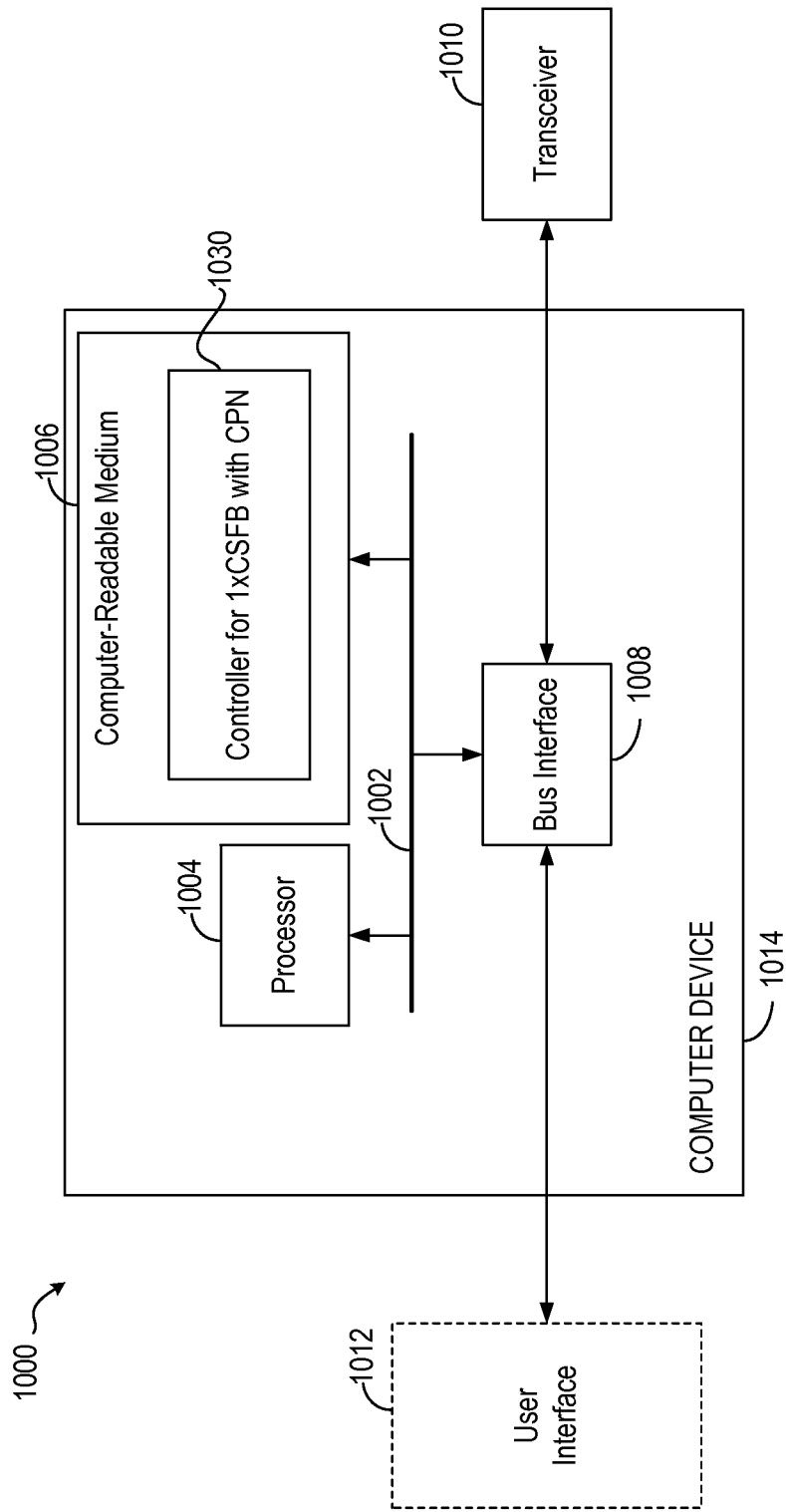
FIG. 10 illustrates a conceptual diagram illustrating a hardware implementation within a network for HO-based 1×CSFB.

FIG. 10 is a conceptual diagram illustrating an example of a hardware implementation for an apparatus 1000 employing a processing system 1014 that communicates CPN to UE during HO-based 1xCSFB. In this example, the processing system 1014 may be implemented with a bus architecture, represented generally by the bus 1002. The bus 1002 may include any number of interconnecting buses and bridges depending on the specific application of the processing system 1014 and the overall design constraints. The bus 1002 links together various circuits including one or more processors, represented generally by the processor 1004, and computer-readable media, represented generally by the computer-readable medium 1006. The bus 1002 may also link various other circuits such as timing sources, peripherals, voltage regulators, and power management circuits, which are well known in the art, and therefore, will not be described any further. A bus interface 1008 provides an interface between the bus 1002 and a transceiver 1010. The transceiver 1010 provides a means for communicating with various other apparatuses over a transmission medium. Depending upon the nature of the apparatus, a user interface 1012 (e.g., keypad, display, speaker, microphone, joystick) may also be provided.

The processor 1004 is responsible for managing the bus 1002 and general processing, including the execution of software stored on the computer-readable medium 1006. The software, when executed by the processor 1004, causes the processing system 1014 to perform the various functions described infra for any particular apparatus. The computer-readable medium 1006 may also be used for storing data that is manipulated by the processor 1004 when executing software.

In one aspect, controller 1030 for 1×CSFB with CPN that is resident in computer-readable medium 1006 and executed by the processor 1004 performs 1× circuit switch fallback (1×CSFB) in a cellular communication system. In particular, controller 1030 ensures that CPN is known at the target 1×CS BSC which actually triggers the alerting at the UE in HO based 1×CSFB. In addition, controller 1030 provides that CPN can be displayed to a user before the UE tunes to 1×CS so that the UE does not have to leave EUTRAN service when a call is rejected.

Figure 11:
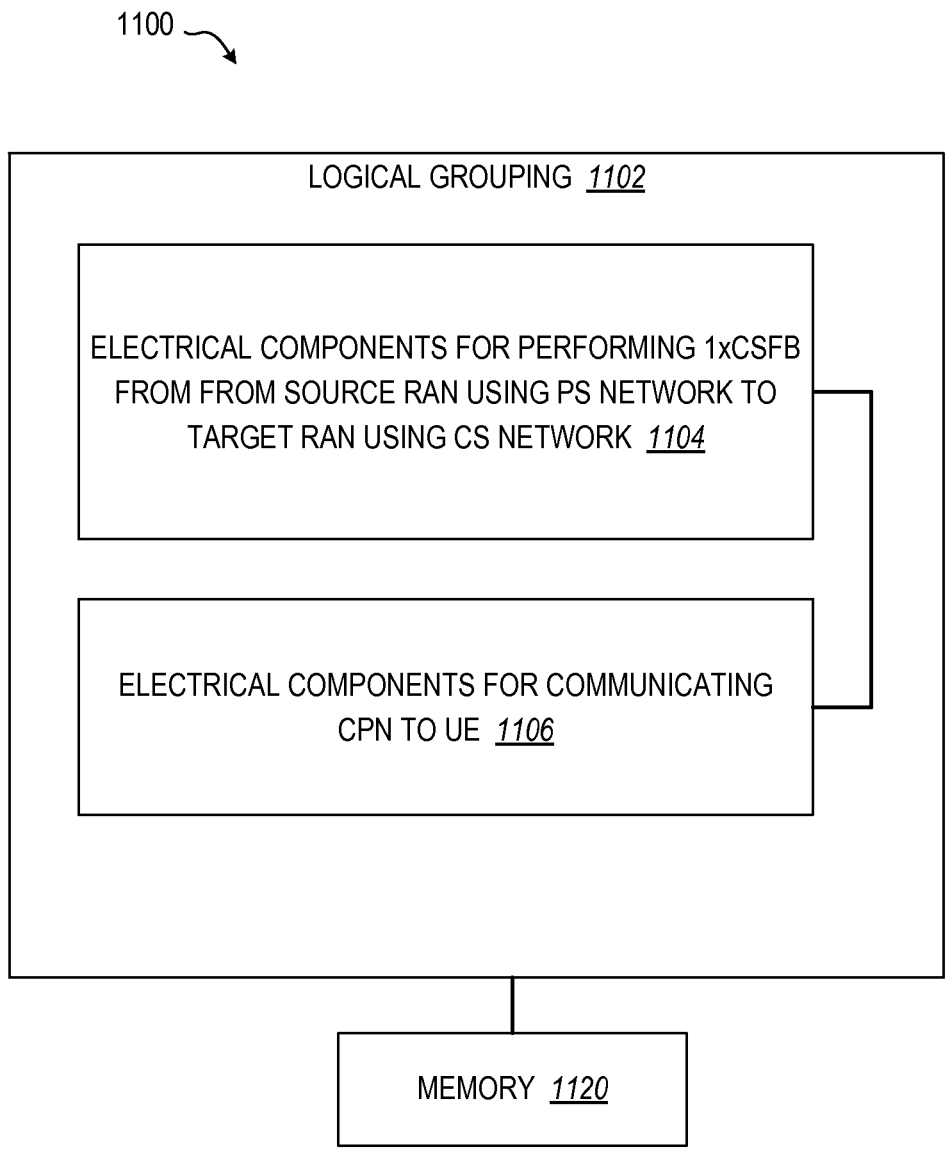
FIG. 11 illustrates a schematic diagram of a system comprising logical groupings of electrical components for HO-based 1×CSFB.

With reference to FIG. 11, illustrated is a system 1100 for 1× circuit switch fallback (1×CSFB) in a cellular communication system. For example, system 1100 can reside at least partially within a network entity as part of a cellular communication system. It is to be appreciated that system 1100 is represented as including functional blocks, which can be functional blocks that represent functions implemented by a computing platform, processor, software, or combination thereof (e.g., firmware). System 1100 includes a logical grouping 1102 of electrical components that can act in conjunction. For instance, logical grouping 1102 can include an electrical component 1104 or first module for performing 1×CSFB from a source RAN using a PS network to a target RAN using a CS network. For instance, logical grouping 1102 can include an electrical component 1106 or second module for communicating a calling party number to the user equipment. Additionally, system 1100 can include a memory 1120 that retains instructions for executing functions associated with electrical components 1104-1106. While shown as being external to memory 1120, it is to be understood that one or more of electrical components 1104-1106 can exist within memory 1120.

By virtue of the foregoing, the present disclosure provides for performing 1× circuit switch fallback mobile termination in a cellular communication system by detecting, at an interworking solution, a fall back of a user equipment from a source radio access network using packet switched network to a target radio access network using a circuit switched network, and by communicating a calling party number to the user equipment.

In a first aspect, communicating the calling party number to the user equipment further comprises adding calling party number to interoperability specification handover messages sent from the interworking solution to the target radio access network via a mobile switching center, and sending a 1× layer 3 message with calling party number to the user equipment.

In a second aspect, communicating the calling party number to the user equipment further comprises sending calling party number with a 1× layer 3 message for channel assignment by interworking solution sent via data tunneling to the user equipment for storing at the user equipment until the user equipment transitions to 1× and acquires a traffic channel. In a particular aspect, sending the calling party number further comprises sending a 1× layer 3 message with calling party number via generic circuit services notification application data tunneling concurrently with a 1× handoff message.

In a third aspect, communicating the calling party number to the user equipment further comprises receiving a paging message with the calling party number from a mobile switching center at the Interworking Solution, and concurrently sending the paging message and a 1× layer 3 message having the calling party number via generic circuit services notification application data tunneling to the user equipment for performing a page match, processing the 1× layer 3 message having the calling party number, and storing the calling party number for displaying after a traffic channel is assigned in 1× network.

In a fourth aspect, communicating the calling party number to the user equipment further comprises sending an alert with information with the calling party number from a mobile switching center to the target radio access network in response to execution of a handover as part of 1× circuit switch fallback procedure before receiving a connect message, and sending a 1× layer 3 message with calling party number to the user equipment. In a particular aspect, the mobile switching center sends the alert with information with the calling party number during both a circuit switch fallback and a native circuit switched operation.

In a fifth aspect, communicating the calling party number to the user equipment further comprises receiving a paging message with a message having the calling party number from a mobile switching center at the interworking solution, sending a 1× layer 3 message having the calling party number via generic circuit services notification application data tunneling to the user equipment first, processing the 1× layer 3 message, and for alerting with the calling party number, sending another 1× layer 3 message when an user accepts a mobile terminated call to the interworking solution, and sending a 1× layer 3 paging message via generic circuit services notification application data tunneling to the user equipment to acknowledge in response to the user equipment indicating acceptance of the calling party number.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Furthermore, various aspects are described herein in connection with a mobile device. A mobile device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method for providing a calling party number (CPN) during 1× circuit switch fallback mobile termination in a cellular communication system, the method comprising:
   triggering, at an interworking solution, a fall back of a user equipment from a source radio access network using a packet switched network to a target radio access network using a circuit switched network;

receiving, in response to a paging of the user equipment, from a mobile switching station (MSC), an assignment request message including the CPN;

performing a 1× handover procedure with the target radio access network, wherein the handover procedure comprises sending a handover message to the target radio access network via the MSC and adding the CPN to said handover message;

sending a 1× message for channel assignment to the UE over a tunnel in the source radio access network;

wherein adding the CPN to the handover message further comprises sending an alert with information with the CPN from the MSC to the target radio access network in response to execution of the handover procedure as part of the 1× circuit switch fallback procedure before receiving a connect message; and communicating the CPN to the user equipment via a 1× layer 3 message transmitted by a base station controller of the target radio access network after the user equipment completes the handover to the target radio access network.

2. The method of claim 1, wherein adding the CPN to a handover message sent to the target radio access network via the MSC further comprises adding the calling party number to an interoperability specification handover message sent from the interworking solution to the target radio access network via a mobile switching center.

3. The method of claim 1, wherein the mobile switching center sends the alert with information with the calling party number during both a circuit switch fallback and a native circuit switched operation.

4. The apparatus of claim 1, wherein the base station controller is not co-located with the interworking solution.

5. At least one processor for providing a calling party number (CPN) during 1× circuit switch fallback mobile termination in a cellular communication system, the at least one processor comprising:

a processor with memory and instructions, at an interworking solution, configured to:

trigger a fall back of a user equipment from a source radio access network using a packet switched network to a target radio access network using a circuit switched network; and receive, in response to a paging of the user equipment, from a mobile switching station (MSC), an assignment request message including the CPN;

perform a 1× handover procedure with the target radio access network, wherein the handover procedure comprises sending a handover message to the target radio access network via the MSC and adding the CPN to said handover message;

send a 1× message for channel assignment to the UE over a tunnel in the source radio access network;

wherein adding the CPN to the handover message further comprises sending an alert with information with the CPN from the MSC to the target radio access network in response to execution of the handover procedure as part of the 1× circuit switch fallback procedure before receiving a connect message; and communicate the CPN to the user equipment via a 1× layer 3 message transmitted by a base station controller of the target radio access network after the user equipment completes the handover to the target radio access network.

6. A non-transitory computer-readable storage medium for providing a calling party number (CPN) during 1× circuit switch fallback mobile termination in a cellular communication system, comprising:

a first set of code for causing a computer to detect, at an interworking solution, a fall back of a user equipment from a source radio access network using a packet switched network to a target radio access network using a circuit switched network; and a second set of code for causing the computer to receive, in response to a paging of the user equipment, from a mobile switching station (MSC), an assignment request message including the CPN;

a third set of code for causing the computer to add the CPN to a handover message sent to the target radio access network via the MSC, wherein the third set of code causes the computer to send an alert with information with the CPN from the MSC to the target radio access network in response to execution of the handover procedure as part of the 1× circuit switch fallback procedure before receiving a connect message; and a fourth set of code for causing the computer to communicate the CPN to the user equipment via a 1× layer 3 message transmitted by a base station controller of the target radio access network after the user equipment completes the handover to the target radio access network.

7. An apparatus for providing a calling party number (CPN) during 1× circuit switch fallback mobile termination in a cellular communication system, the apparatus comprising:

a controller for triggering, at an interworking solution, a fall back of a user equipment from a source radio access network using packet switched network to a target radio access network using a circuit switched network; and a network interface for:

receiving, in response to a paging of the user equipment, from a mobile switching station (MSC), an assignment request message including the CPN;

performing a 1× handover procedure with the target radio access network, wherein the handover procedure comprises sending a handover message to the target radio access network via the MSC and adding the CPN to said handover message;

sending a 1× message for channel assignment to the UE over a tunnel in the source radio access network;

wherein adding the CPN to the handover message further comprises sending an alert with information with the CPN from the MSC to the target radio access network in response to execution of the handover as part of the 1× circuit switch fallback procedure before receiving a connect message; and communicating the CPN to the user equipment via a 1× layer 3 message transmitted by base station controller of the target radio access network after the user equipment completes the handover to the target radio access network.

8. The apparatus of claim 7, wherein the network interface is further for communicating the calling party number to the user equipment by adding the calling party number to an interoperability specification handover message sent from the interworking solution to the target radio access network via a mobile switching center and for sending a 1× layer 3 message with calling party number to the user equipment.

9. The apparatus of claim 7, wherein the mobile switching center sends the alert with information with the calling party number during both a circuit switch fallback and a native circuit switched operation.

10. The apparatus of claim 7, wherein the base station controller is not co-located with the interworking solution.

* * * * *